US006546247B1

(12) United States Patent
Foti et al.

(10) Patent No.: US 6,546,247 B1
(45) Date of Patent: Apr. 8, 2003

(54) HOME LOCATION SERVER AND CALL PROCESSING METHOD IN A HYBRID SECOND/THIRD GENERATION RADIO TELECOMMUNICATIONS NETWORK

(75) Inventors: George Foti, Dollard des Ormeaux (CA); Sorin Surdila, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 318 days.

(21) Appl. No.: 09/658,768

(22) Filed: Sep. 8, 2000

(51) Int. Cl.[7] .................................................. H04Q 7/20
(52) U.S. Cl. ....................... 455/433; 455/414; 455/435; 455/436; 370/467; 370/328; 370/475
(58) Field of Search ................................. 455/433, 414, 455/435, 436, 437, 422, 426, 560; 370/467, 328, 475

(56) References Cited

U.S. PATENT DOCUMENTS

| | | | |
|---|---|---|---|
| 5,828,949 A | * | 10/1998 | Silver et al. ................. 455/433 |
| 6,230,005 B1 | * | 5/2001 | Le et al. ...................... 455/414 |
| 6,353,621 B1 | * | 3/2002 | Boland et al. .............. 370/467 |
| 6,377,804 B1 | * | 4/2002 | Lintulampi .................. 455/435 |
| 6,385,451 B1 | * | 5/2002 | Kalliokulju et al. ........ 455/437 |
| 6,389,008 B1 | * | 5/2002 | Lupien et al. .............. 370/352 |

* cited by examiner

Primary Examiner—Thanh Cong Le
Assistant Examiner—A T Harry
(74) Attorney, Agent, or Firm—Smith & Danamraj, PC

(57) ABSTRACT

A Home Location Server (HLS) and method of processing an incoming real-time call to a Mobile Station (MS) in a hybrid radio telecommunications network having both second generation (2G) and third generation (3G) service nodes. When a request for location information for the called MS is received in the HLS from an interrogating switch where the incoming call originated, the HLS determines whether the called MS is located in a 2G Mobile Switching Center (MSC), or a 3G Call State Control Function (CSCF). If neither, the HLS concludes that the called MS is located in an Serving General Packet Radio Service (GPRS) Support Node (SGSN). A 3G flag, which is set in the subscriber profile when the MS registers with a 3G SGSN, is checked to determine whether the SGSN is a 2G SGSN or a 3G SGSN. If the SGSN is a 2G SGSN, the HLS informs the interrogating switch that the MS is not available for the real-time call. If the SGSN is a 3G SGSN, the HLS orders the SGSN to page the MS and determine whether the MS accepts the incoming call.

20 Claims, 4 Drawing Sheets

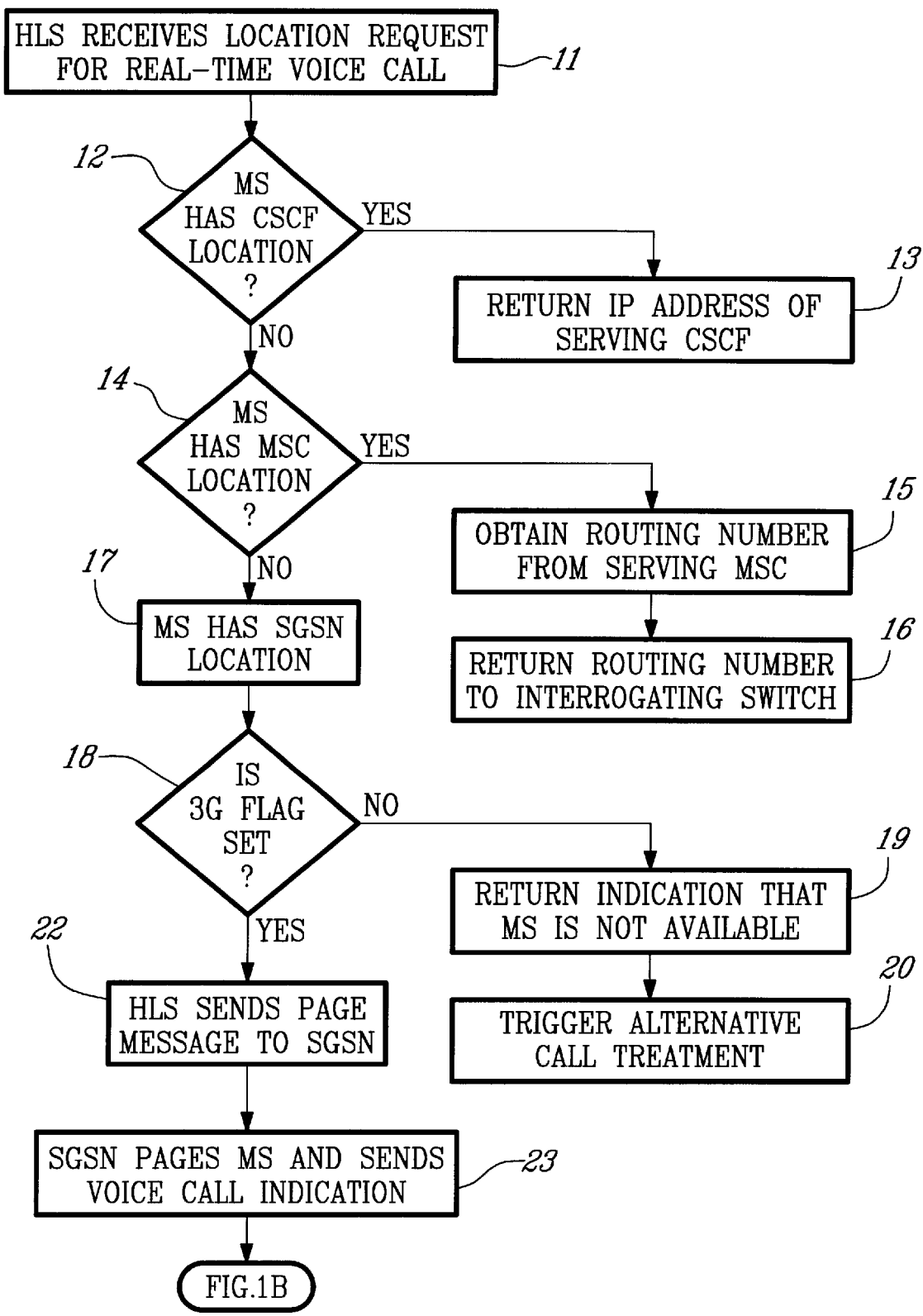

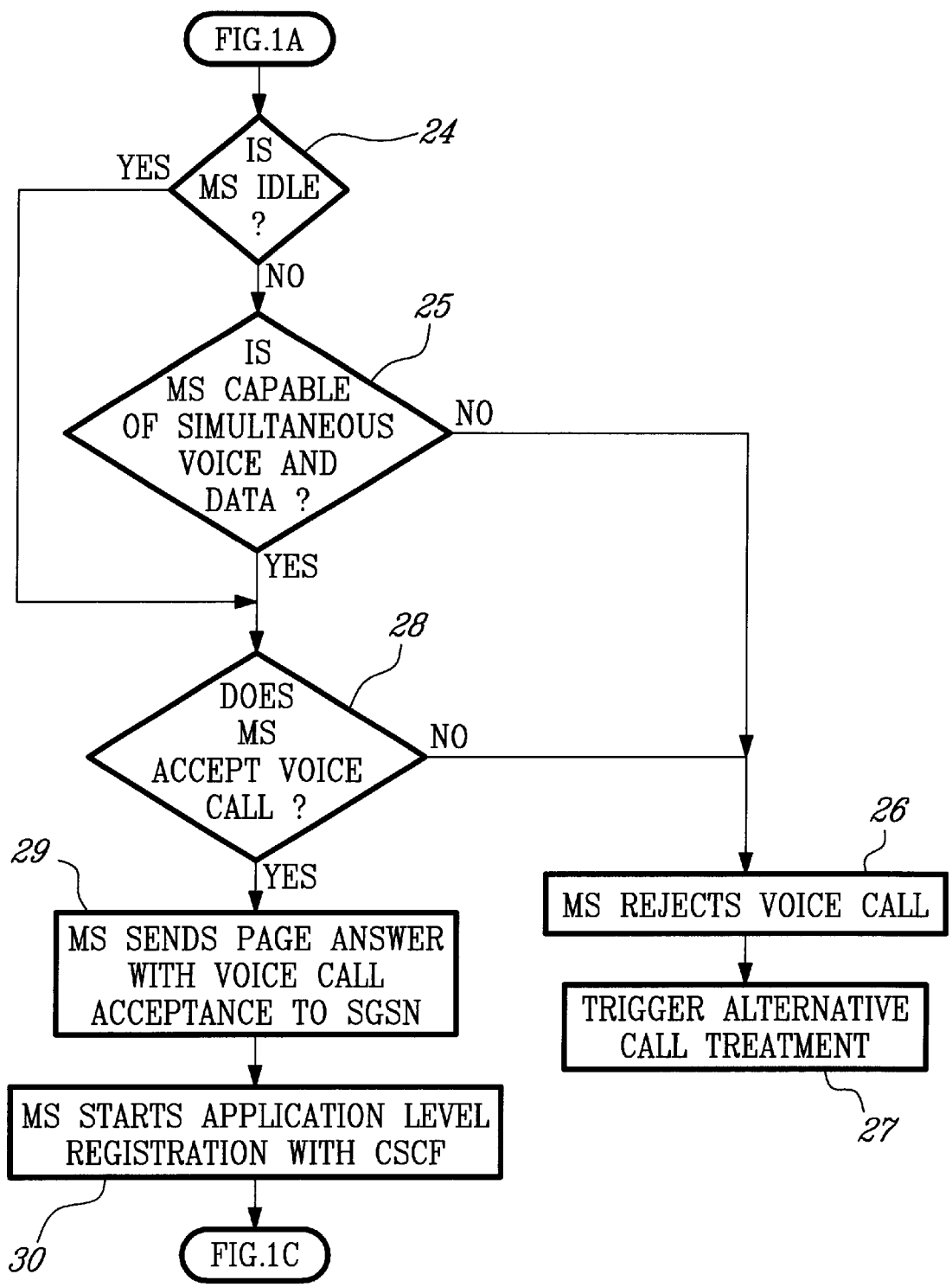

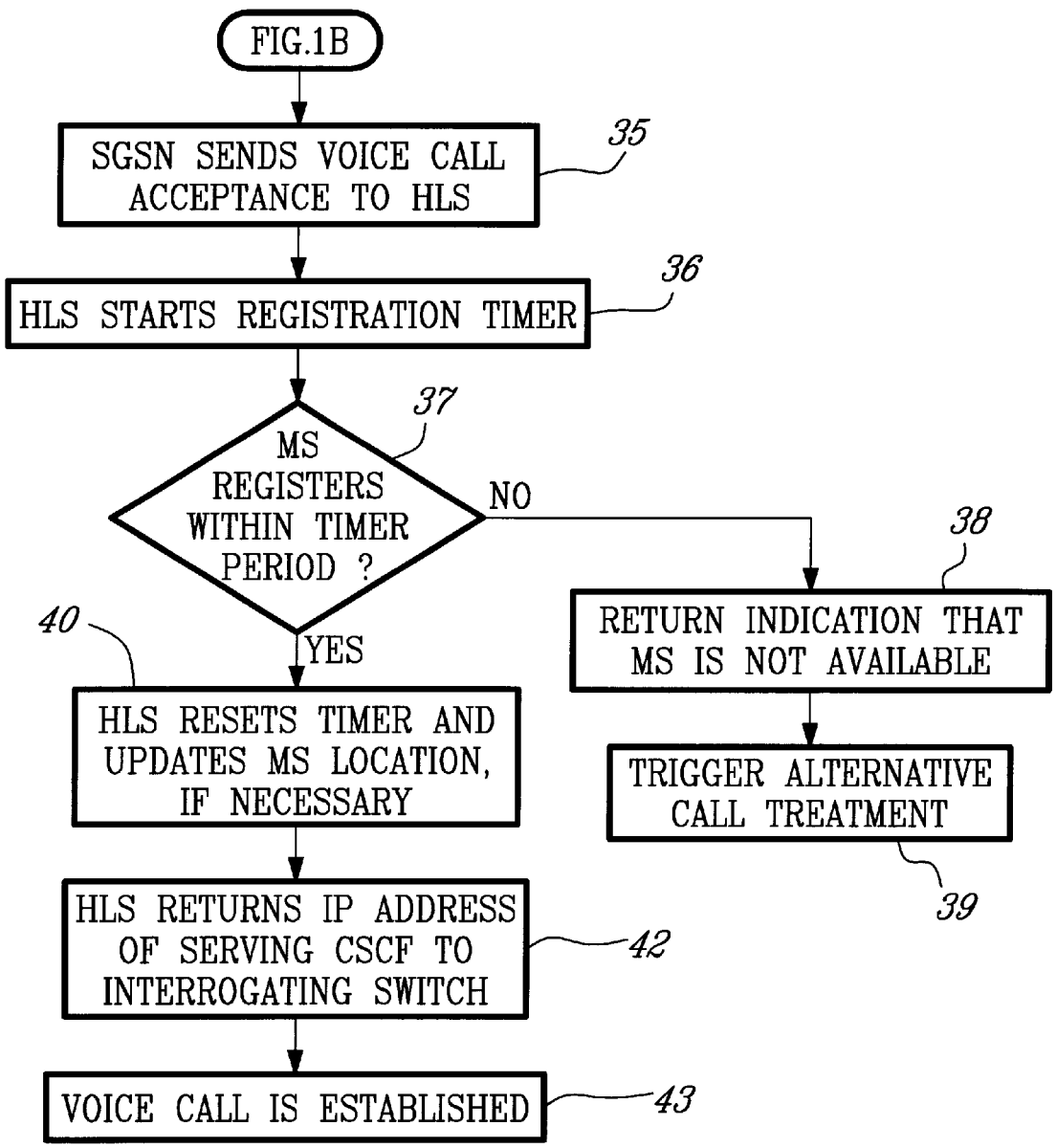

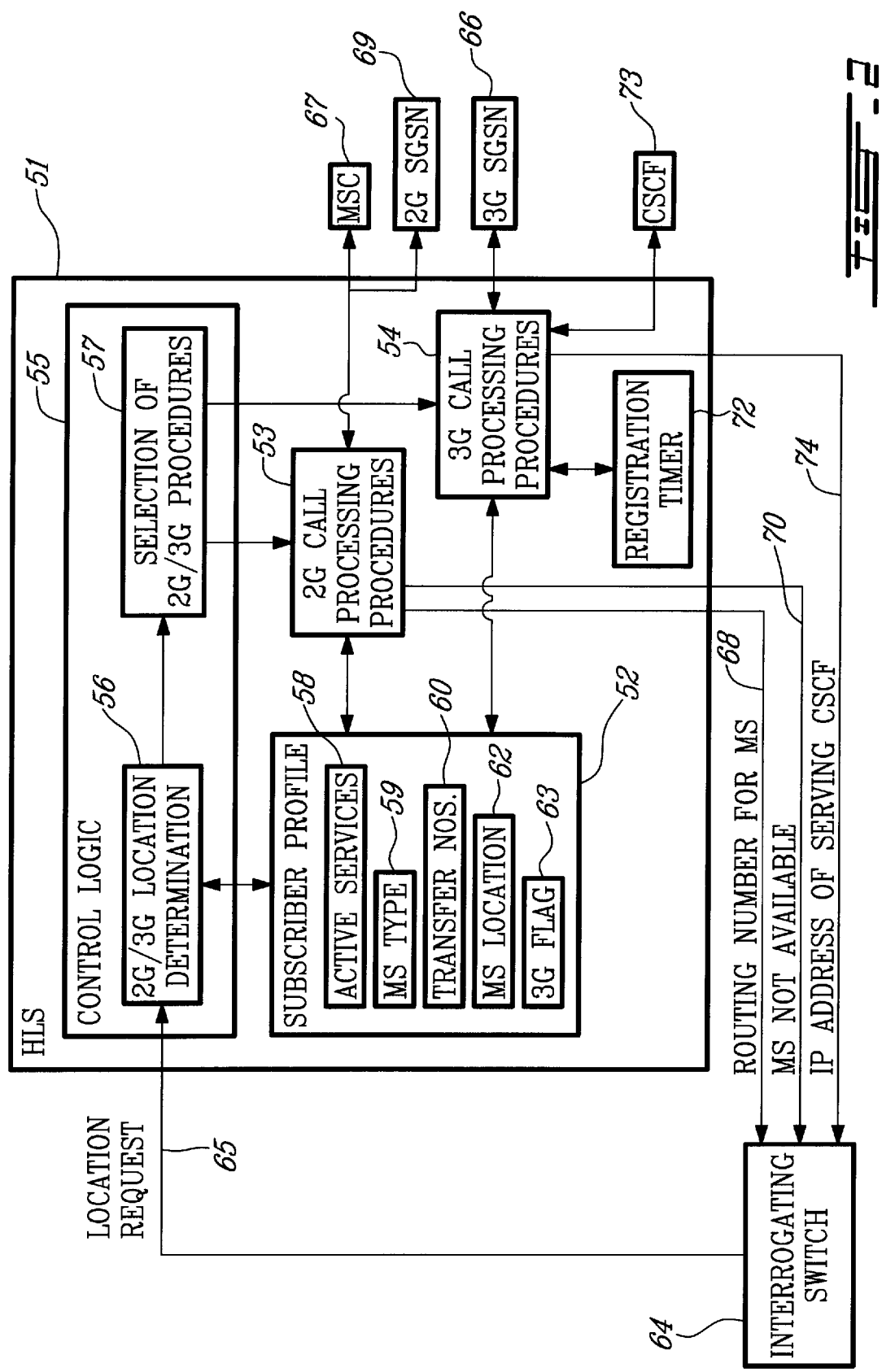

HOME LOCATION SERVER AND CALL PROCESSING METHOD IN A HYBRID SECOND/THIRD GENERATION RADIO TELECOMMUNICATIONS NETWORK

BACKGROUND OF THE INVENTION

1. Technical Field of the Invention

This invention relates to telecommunication systems and, more particularly, to a Home Location Server (HLS) and method of processing an incoming real-time call to a mobile station (MS) in a hybrid radio telecommunications network having both second generation and third generation service nodes.

2. Description of Related Art

In radio telecommunications, the term "second generation" (2G) refers to legacy circuit-switched networks, and "third generation" (3G) refers to new packet-switched networks generally operating with the Internet Protocol (IP) and providing a full range of data and real-time applications such as voice, video, and other multimedia applications. During the time period that 3G.IP networks are being phased in, networks will operate with some areas of 2G only coverage, some areas of 3G only coverage, and some areas where both 2G coverage and 3G coverage are available. Most of the mobile stations (MSs) operating in such hybrid radio telecommunications networks will be capable of operating in both 2G circuit-switched service nodes and 3G packet-switched service nodes. Therefore, an MS may roam between 2G Mobile Switching Centers (MSCs), 3G Call State Control Functions (CSCFs), and, in General Packet Radio Service (GPRS) networks, between 2G Serving GPRS Support Nodes (SGSNs) and 3G SGSNs. All such nodes are referred to generically herein as "switches".

When processing a call to an MS in a hybrid network, the call is first received in an originating switch. The switch determines the location of the called MS by sending a location request to the MS's associated Home Location Register (HLR). The response of the HLR is dependent on whether the called MS is being served by a 2G switch such as an MSC, or whether it is being served by a 3G switch such as a CSCF. This is because there are some 3G functions and procedures that are not applicable to the 2G environment, and it is desirable for the HLR to download only what is pertinent to the serving switch. For example, if the MS is roaming in a 2G MSC, and the HLR is interrogated for location information for the MS, the HLR should return a roaming number to the interrogating switch. On the other hand, if the MS is roaming in a 3G CSCF, the HLR should return an IP address for the 3G CSCF when the HLR is interrogated.

When the called MS is roaming in a 2G MSC, the identity of the serving MSC is sent to the HLR when the MS first registers in the MSC's service area. The HLR knows from the identity of the MSC that it is a 2G switch. Therefore, when the HLR is interrogated for location information for the called MS, the HLR knows to return a roaming number to the interrogating switch. Hence, the HLR requests a roaming number from the serving MSC for that purpose, and returns the roaming number to the interrogating switch. Likewise, if the called MS is roaming in a 3G CSCF, the identity of the serving CSCF is sent to the HLR when the MS first registers in the CSCF's service area. The HLR knows from the identity of the CSCF that it is a 3G switch. Therefore, the HLR knows to return the IP address of the serving CSCF to any switch that interrogates the HLR for location information for the called MS.

A problem arises, however, when the MS is roaming in an SGSN in a GPRS network. Second generation SGSNs support only data applications while 3G SGSNs support both data and some real-time applications (with the exception of IP telephony which is only supported by CSCFs). An internal software upgrade converts a 2G SGSN to a 3G SGSN, but the registration message that is sent to the HLR when an MS registers there is the same. Thus, the HLR currently has no way to know whether the serving SGSN is a 2G SGSN or a 3G SGSN, and no way to determine the correct response to a location request. When the MS is in a 2G SGSN, the HLR should return a roaming number in response to a location request, while an IP address should be returned when the MS is in a 3G SGSN.

SUMMARY OF THE INVENTION

In one aspect, the present invention is a method of processing an incoming real-time call to an MS in a hybrid radio telecommunications network having both second generation (2G) and third generation (3G) service nodes. The method begins when a request for location information for the called MS is received in a Home Location Server (HLS) from an interrogating switch where the incoming call originated. The method includes the steps of determining by the HLS, whether the called MS is located in a 2G MSC or a 3G CSCF, and concluding that the called MS is located in an SGSN if the called MS is not located in either a 2G MSC or a 3G CSCF. This is followed by determining whether the SGSN is a 2G SGSN or a 3G SGSN, and informing the interrogating switch that the MS is not available for the real-time call, upon determining that the SGSN is a 2G SGSN. Upon determining that the SGSN is a 3G SGSN, the HLS orders the SGSN to page the MS and determine whether the MS accepts the incoming call. If the call is accepted, the MS performs a timely application level registration with a serving CSCF. Accordingly, the location of the subscriber is then set in the HLS. The HLS then sends the address of the serving CSCF to the interrogating switch.

In another aspect, the present invention is an HLS for processing an incoming real-time call to an MS in a hybrid radio telecommunications network having both 2G and 3G service nodes. The HLS includes control logic for receiving a request for location information for the called MS from an interrogating switch where the incoming call originated. A subscriber profile includes location information for the called MS, and a 3G flag that is set when the MS registers in a 3G SGSN. A 2G/3G location function accesses the subscriber profile to determine whether the called MS is located in a 2G MSC, a 3G CSCF, a 2G SGSN, or a 3G SGSN. The HLS also includes 2G call processing logic that performs 2G call processing procedures when the 2G/3G location function determines that the called MS is located in a 2G MSC, and 3G call processing logic that performs 3G call processing procedures when the 2G/3G location function determines that the called MS is located in a 3G CSCF or 3G SGSN.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 1A–1C are a flow chart illustrating the method of the present invention, performed by a Home Location Server (HLS) when processing a real-time voice call in a hybrid radio telecommunications network; and FIG. 2 is a block diagram of the preferred embodiment of an HLS of the present invention.

DETAILED DESCRIPTION OF EMBODIMENTS

The present invention introduces a Home Location Server (HLS) that combines 2G functionality, 3G functionality, and control logic to determine what generation of switch the MS is located in, and to choose the correct call processing procedures for that generation of switch.

There are two types of registrations in a 3G network: bearer level registration and application level registration. Bearer level registration provides the MS with permission to access the network and perform pure data transfer for activities such as Web browsing or sending e-mail. Application level registration enables the MS to launch applications requiring greater network resources including real time capabilities, Quality of Service (QOS), etc., such as voice, video, or other multimedia applications. The application level registration provides needed information to the network server to determine whether the requesting MS is authorized for the requested application and whether proper billing can be done.

At bearer level registration, the HLS must be informed whether the serving SGSN is a 2G or a 3G SGSN. This is done in the present invention by having 3G SGSNs insert a 3G indication in the Global System for Mobile Communications (GSM) Mobile Application Part (MAP) Registration message. The HLS then sets a flag in the MS's subscriber profile indicating that the MS is being served by a 3G switch. If the MS is in a 2G SGSN, no change is made to the Registration message, and the HLS concludes that the MS is being served by a 2G switch. Therefore, when an incoming call is placed to the MS, and an originating switch interrogates the HLS for location information, the HLS can take the correct actions, depending on the information that it has stored about the MS in its database.

FIGS. 1A–1C are a flow chart illustrating the steps performed by an HLS when processing a real-time voice call in a hybrid network. The method begins at step 11 of FIG. 1A when the HLS receives a location request for delivery of a real-time voice call or other multimedia call to a called MS. The HLS first checks the subscriber profile for the MS to determine whether the MS has a 2G or a 3G location. If the called MS has a CSCF location at step 12, it is known to be a 3G location. Therefore, the HLS returns the IP address of the serving CSCF to the interrogating switch at step 13. If the MS does not have a CSCF location, it is determined at step 14 whether or not the MS has an MSC location. If the called MS has an MSC location, it is known to be a 2G location. Therefore, at step 15, the HLS sends a Routing Request message to the serving MSC to obtain a routing number for the called MS. At step 16, the serving MSC returns a routing number, and the HLS sends the routing number to the interrogating switch.

If the called MS does not have either a CSCF or an MSC location, then the HLS concludes that it has an SGSN location, as shown at 17. In this case, the HLS must determine whether the serving SGSN is a 2G or a 3G SGSN. Therefore, at step 18, the HLS checks the subscriber profile for the MS to determine whether the 3G flag has been set as a result of receiving a Registration message from a 3G SGSN. If the flag is not set, the MS is in a 2G SGSN, and real-time voice is not supported. Therefore, at step 19, the HLS returns an indication to the interrogating switch that the MS is not available. This triggers alternative call treatment at step 20 such as call transfer to voice mail or another number based on the subscriber's profile.

If the 3G flag is set in the HLS, the process moves to step 22 where the HLS sends a Page message to the 3G SGSN, since 3G SGSNs can handle real-time applications. The Page message is new since an existing HLR cannot request an SGSN to send a page. At step 23, the SGSN pages the MS with an indication that a voice call is pending. The process then moves to FIG. 1B.

If it is determined at step 24 of FIG. 1B that the MS is currently idle, the process then moves directly to step 28. However, if the MS is already engaged in a data session or a real-time session other than voice, it is determined at 24 that the MS is not idle, and the process moves to step 25 where it is determined whether the MS is capable of simultaneously handling the existing session and the incoming voice call. If not, the MS may automatically reject the voice call at step 26 through a negative response to the page. At step 27, alternative call treatment is triggered in the HLS when it receives the negative response from the 3G SGSN, such as call transfer to voice mail or another number based on the subscriber's profile. However, if the MS is capable of simultaneous voice and data sessions, the process moves from step 25 to step 28 where it is determined whether the MS accepts the voice call. If the MS does not accept the voice call, the process moves to steps 26 and 27 where the voice call is rejected and alternative call treatment is triggered.

Two things happen if the voice call is accepted at step 28. First, at step 29, the MS sends a page answer to the SGSN that contains an indication that the voice call is accepted. Then, at step 30, the MS starts an application level registration with a CSCF that is serving the area where the MS is roaming, and is capable of handling real-time IP telephony. The application level registration transmits to the HLS, the address of the serving CSCF that will handle the voice call. This is done so that other incoming voice calls for the MS can be sent there. The process then moves to FIG. 1C.

At step 35 of FIG. 1C, the SGSN forwards the acceptance of the voice call to the HLS which starts a timer at 36 waiting for the application level registration. At 37, it is determined whether or not the MS performs the application level registration within the timer period. If the MS does not register within the timer period, the process moves to step 38 where the HLS returns an indication to the interrogating switch that the MS is not available. This triggers alternative call treatment at step 39 such as call transfer to voice mail or another number based on the subscriber's profile. If the MS registers within the timer period, the HLS resets the timer and updates the MS location, if necessary, at step 40. The HLS then returns the IP address of the serving CSCF to the interrogating switch at 42, and the call is established at step 43.

FIG. 2 is a block diagram of the preferred embodiment of an HLS 51 of the present invention. The HLS includes a subscriber profile 52 for a called MS, logic for 2G call processing procedures 53, logic for 3G call processing procedures 54, and control logic 55. The control logic includes logic 56 for determining whether the MS is located in a 2G location or a 3G location, and logic 57 for selecting 2G or 3G call processing procedures. The subscriber profile is a database of subscriber information that may include, for example, active services 58, the MS type 59, transfer numbers 60, the last reported MS location 62, and the 3G flag 63.

When an interrogating switch 64 sends a location request 65 to the HLS for a real-time voice call, the logic 56 first determines whether the MS is located in a 2G location or a 3G location. The subscriber profile 52 is checked to determine whether the MS is in a 3G CSCF, a 2G MSC, or if the MS is in an SGSN, whether the 3G flag 63 has been set. As noted above, the flag is set when the MS registers with a 3G SGSN 66. Following the 2G/3G location determination, the logic 57 selects appropriate call processing procedures 53 or 54. If the MS is located in a 2G MSC, the HLS obtains a routing number for the MS from the MSC 67 where the MS is located. The HLS then returns the routing number 68 for the MS to the interrogating switch 64. If the MS is in a 2G SGSN 69, then real-time voice calls are not supported, so the HLS returns an indication 70 to the interrogating switch that the MS is not available. If the MS is located in a 3G CSCF, then the HLS returns the IP address 74 of the serving CSCF to the interrogating switch 64. If the MS is in a 3G SGSN, the HLS orders the MS to be paged, and obtains the MS's acceptance of the incoming voice call. The HLS then starts the registration timer 72, and if the MS completes an application level registration with a serving CSCF 73 before the timer expires, the HLS returns the IP address 74 of the serving CSCF to the interrogating switch 64.

It is thus believed that the operation and construction of the present invention will be apparent from the foregoing description. While the method and HLS shown and described has been characterized as being preferred, it will be readily apparent that various changes and modifications could be made therein without departing from the scope of the invention as defined in the following claims.

What is claimed is:

1. A method of processing an incoming real-time call to a mobile station (MS) in a hybrid radio telecommunications network having both second generation (2G) and third generation (3G) service nodes, said method comprising the steps of:
   receiving in a Home Location Server (HLS), a request for location information for the called MS from an interrogating switch where the incoming call originated;
   determining by the HLS, whether the called MS is located in a 2G or a 3G service node;
   performing 2G call processing procedures, upon determining that the called MS is located in a 2G service node; and
   performing 3G call processing procedures, upon determining that the called MS is located in a 3G service node.

2. The method of processing an incoming real-time call of claim 1 wherein the called MS is located in a Serving General Packet Radio Service (GPRS) Support Node (SGSN), and the step of determining by the HLS whether the called MS is located in a 2G or a 3G service node includes determining whether the called MS is located in a 2G SGSN or a 3G SGSN.

3. The method of processing an incoming real-time call of claim 2 wherein the step of determining whether the called MS is in a 2G or a 3G SGSN includes the steps of:
   setting a 3G flag in a subscriber profile in the HLS whenever the MS registers in a 3G SGSN;
   removing the 3G flag if the MS subsequently registers in a 2G SGSN; and
   determining whether the 3G flag is set in the subscriber profile.

4. The method of processing an incoming real-time call of claim 2 wherein the called MS is located in a 3G SGSN, and the step of performing 3G call processing procedures includes sending a page message from the HLS to the 3G SGSN ordering the 3G SGSN to page the MS, said page message including an indication of the incoming real-time call.

5. The method of processing an incoming real-time call of claim 4 wherein the step of performing 3G call processing procedures also includes the steps of:
   determining whether the MS accepts the real-time call; and
   sending a page answer indicating whether the MS accepted the real-time call to the 3G SGSN and the HLS.

6. The method of processing an incoming real-time call of claim 5 wherein the step of performing 3G call processing procedures also includes the steps of:
   performing by the MS, an application level registration with a Call State Control Function (CSCF) that is capable of handling the real-time call;
   starting a registration timer in the HLS; and
   sending an IP address of the CSCF from the HLS to the interrogating switch if the MS performs the application level registration before the timer expires.

7. The method of processing an incoming real-time call of claim 2 wherein the called MS is located in a 2G SGSN, and the step of performing 2G call processing procedures includes sending from the HLS to the interrogating switch, an indication that the called MS is not available.

8. The method of processing an incoming real-time call of claim 1 wherein the called MS is located in a 3G Call State Control Function (CSCF), and the step of performing 3G call processing procedures includes sending an Internet Protocol (IP) address for the CSCF from the HLS to the interrogating switch.

9. The method of processing an incoming real-time call of claim 1 wherein the called MS is located in a 2G Mobile Switching Center (MSC), and the step of performing 2G call processing procedures includes the steps of:
   obtaining a routing number for the called MS from the MSC; and
   sending the routing number from the HLS to the interrogating switch.

10. A method of processing an incoming real-time call to a mobile station (MS) in a hybrid radio telecommunications network having both second generation (2G) and third generation (3G) service nodes, said method comprising the steps of:
    receiving in a Home Location Server (HLS), a request for location information for the called MS from an interrogating switch where the incoming call originated;
    determining by the HLS, whether the called MS is located in a 2G Mobile Switching Center (MSC);
    determining by the HLS, whether the called MS is located in a 3G Call State Control Function (CSCF);
    concluding by the HLS, that the called MS is located in a Serving General Packet Radio Service (GPRS) Support Node (SGSN), upon determining that the called MS is not located in a 2G MSC or a 3G CSCF;
    determining whether the SGSN is a 2G SGSN or a 3G SGSN;
    upon determining that the SGSN is a 2G SGSN, informing the interrogating switch that the MS is not available for the real-time call; and
    upon determining that the SGSN is a 3G SGSN:
    performing by the MS, an application level registration with a CSCF that is capable of handling the real-time call; and
    sending an address for the real-time capable CSCF to the interrogating switch.

11. The method of processing an incoming real-time call of claim 10 wherein the step of determining whether the SGSN is a 2G SGSN or a 3G SGSN includes the steps of:

setting a 3G flag in a subscriber profile in the HLS whenever the MS registers in a 3G SGSN;

removing the 3G flag is the MS subsequently registers in a 2G SGSN; and determining whether the 3G flag is set in the subscriber profile.

12. The method of processing an incoming real-time call of claim 10 further comprising, before the step of sending an address for the real-time capable CSCF to the interrogating switch, the step of determining whether the called MS accepts the incoming real-time call.

13. The method of processing an incoming real-time call of claim 12 wherein the step of determining whether the called MS accepts the incoming real-time call includes the steps of:

sending a page message from the HLS to the 3G SGSN ordering the SGSN to page the MS, said page message including an indication of the incoming real-time call; and sending a page answer from the MS to the SGSN indicating whether the MS accepted the real-time call.

14. A Home Location Server (HLS) for processing an incoming real-time call to a mobile station (MS) in a hybrid radio telecommunications network having both second generation (2G) and third generation (3G) service nodes, said HLS comprising:

control logic for receiving a request for location information for the called MS from an interrogating switch where the incoming call originated;

a subscriber profile that includes location information for the called MS, and a 3G flag that is set when the MS registers in a 3G Serving General Packet Radio Service (GPRS) Support Node (SGSN);

a 2G/3G location function that accesses the subscriber profile to determine whether the called MS is located in a 2G Mobile Switching Center (MSC), a 3G Call State Control Function (CSCF), a 2G SGSN, or a 3G SGSN;

2G call processing logic that performs 2G call processing procedures when the 2G/3G location function determines that the called MS is located in a 2G MSC; and 3G call processing logic that performs 3G call processing procedures when the 2G/3G location function determines that the called MS is located in a 3G CSCF or 3G SGSN.

15. The HLS of claim 14 wherein the 3G call processing logic includes:

means for sending a paging order to a 3G SGSN when the 2G/3G location function determines that the called MS is located in a 3G SGSN; and means for receiving a page answer that indicates whether the called MS has accepted the incoming real-time call.

16. The HLS of claim 15 further comprising a registration timer connected to the 3G call processing logic for determining whether the MS completes an application level registration with a Call State Control Function (CSCF) within a predefined time period after accepting the incoming call.

17. The HLS of claim 16 wherein the 3G call processing logic includes means for sending an address for the CSCF to the interrogating switch when the MS completes an application level registration within the predefined time period.

18. The HLS of claim 14 wherein the 2G/3G location function determines that the called MS is located in a 3G CSCF, and the 3G call processing logic includes means for sending an Internet Protocol (IP) address for a serving CSCF to the interrogating switch.

19. The HLS of claim 14 wherein the 2G/3G location function determines that the called MS is located in a 2G MSC, and the 2G call processing logic includes:

means for obtaining a routing number for the called MS from the MSC; and means for sending the routing number from the HLS to the interrogating switch.

20. The HLS of claim 14 wherein the 2G/3G location function determines that the called MS is located in a 2G SGSN, and the 2G call processing logic includes means for sending from the HLS to the interrogating switch, an indication that the called MS is not available.

* * * * *